UNITED STATES PATENT OFFICE 2,380,790

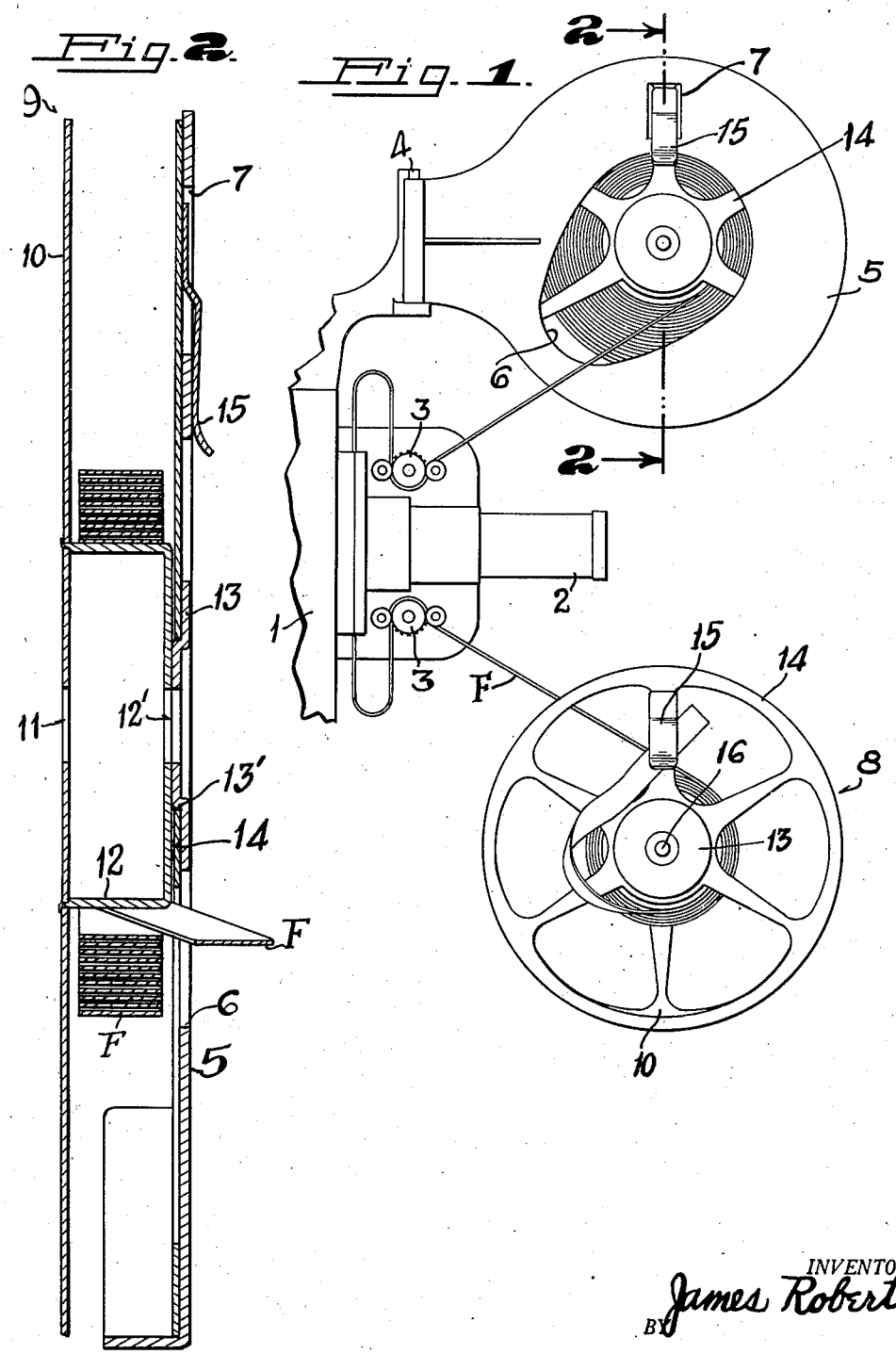

FILM REEL

James Robertson, San Francisco, Calif.

Application September 20, 1943, Serial No. 503,142

7 Claims. (Cl. 88—18.7)

This invention relates to improvements in film projectors, and more particularly to novel film handling apparatus which does away with the usual rewinding of the film after each showing thereof.

An object of my invention is to provide an improved film reel for use with projectors, having a novel construction permitting its use first as an unwinding reel and then as a receiving reel, thereby avoiding the necessity of rewinding the film after each projection.

Another object of my invention is to provide an improved film reel for use with projectors having a simplified construction designed to permit the uninterrupted and smooth feeding of a film through a projector.

Other and further objects of my invention will be pointed out hereinafter, or will be indicated in the appended claims, or will be obvious to one skilled in the art upon an understanding of the present disclosure. For the purpose of this application, I have elected to show herein certain details of a film reel representative of my invention; it is to be understood, however, that the embodiment of my invention herein shown and described is for the purpose of illustration only, and that therefore it is not to be regarded as exhaustive of the variations of the invention, nor is it to be given an interpretation such as might have the effect of limiting the claims short of the true and most comprehensive scope of the invention in the art.

In the accompanying drawing:

Fig. 1 is a diagrammatic view illustrating the relative arrangement of the film unwinding and film receiving reels when operatively mounted on a projector; and Fig. 2 is a vertical section taken on the line 2—2 of Fig. 1.

Referring to the drawing, 1 designates a projector, 2 a lens tube on the projector, 3 the usual sprockets over which a film extends when being fed through the projector, and a vertically disposed supporting member 4 on the upper front part of the projector.

Detachably supported on the supporting member 4 is a disk-like support 5 having a suitable opening 6 of somewhat elliptical shape arranged centrally therein. The support 5 is also provided above its center with a clip receiving opening 7.

The film winding arrangement constituting the subject matter of my invention comprises two identical reels 8 and 9, the former being here designated as the film unwinding reel from which the film is fed, and the latter the film receiving reel upon which the film is wound after passing through the projector. The film is fed from the unwinding reel and taken up by the receiving reel through the operation of the usual mechanism with which film projectors are equipped.

The two reels being identical in construction, a description of one will suffice for both. The reels each embody a suitably apertured and shaped disk 10 having an axial opening 11. Secured to the disk 10 is a hub 12 which is slightly wider than the width of the particular film which is normally wound thereon. The hub 12 is provided with an axial opening 12' which is aligned with the axial opening 11 of the disk 10. The hub is provided with an outwardly disposed circular flange 13 having an annular shoulder 13' upon which an apertured disk 14 is loosely mounted. The disk 14 is provided with a clip 15 which, when the reel is used as an unwinding reel 9, extends through the opening 7 of the support 5 and is clamped on the latter to effect the support of the said reel in an operative position with respect to the film projector. The engagement of the clip 15 with the support 5 as described, holds the disk 14 against rotation or displacement. The flange 13 and the disk 14 being rotatably arranged with respect to each other, allows the free rotation of the disk 10, the hub 12 and the said flange. When the reel is used as a receiving reel, the end of the film F is extended partly around the hub 12 and then passed outwardly through the largest of the various apertures in the disk 14 to the clip 15 which engages with and holds the same as the film is wound around the said hub, as shown in the lower part of Fig. 1. The aligned axial openings 11 and 12' are adapted to receive a rotatable spindle or shaft 16 when the reel is used as the receiving or take-up reel. These axial openings do not perform any useful purpose when the reel is used as an unwinding reel.

In practice the unwinding reel 9 having the supply of film F wound in convolutions thereon is secured in the manner described to the support 5. The end of the inner convolution of the film F is passed through the central opening 6 in the support 5, and threaded in the usual manner through the projector, after which it is secured by the clip 15 in the manner described to the receiving reel 8. As the film is fed from the reel 9 through the projector, it is wound around the hub 12 of the receiving reel 8. During the unwinding operation of the reel 9 its disc 10 and hub 12 are free to rotate as the film is drawn therefrom. Ordinarily these parts of the unwinding reel rotate with the unwinding of the film, but since the inner convolution of the film is loosely arranged on the hub after the film is first threaded through the projector, the entire roll is free to rotate about the hub during the unwinding operation.

After the film has passed through the projector and is entirely wound about the hub of the receiving reel 8, the projection of the film may be repeated by exchanging the positions of the two reels and again feeding the film through the projector. The usual rewinding of the film onto another reel before it can be again projected is not necessary when employing the principles of the present invention.

Having described my invention, what I claim is:

1. In a film reel, two spaced disks, one being rotatably arranged with respect to each other, one of the disks having a film outlet and means for securing it in a non-rotatable position on a support, and the other of the disks being rotatable and carrying a film supporting hub on which film is adapted to be wound.

2. In a film reel adapted for use as a receiving reel and as an unwinding reel, two spaced disks rotatably arranged with respect to each other, one being stationary and the other rotatable, the stationary disk having a film outlet and means for securing it in a detachable but non-rotatable position on a projector, and the rotatable disk carrying a film supporting hub arranged between the disks on which film is wound when the reel is used as a receiving reel and from which film is unwound when the reel is used as an unwinding reel.

3. In film winding mechanism for projectors, a reel adapted for use either as a receiving reel or as an unwinding reel, two spaced disks rotatably arranged with respect to each other, one being stationary and the other rotatable when the reel is employed as an unwinding reel, a film supporting hub carried by the rotatable disk on which film is wound when the reel is used as a receiving reel and from which film is unwound when the reel is used as an unwinding reel, means carried by the stationary disk for securing the reel to a support and for preventing the rotation of the stationary disk when the reel is used as an unwinding reel, and a film outlet in the stationary disk.

4. In a film winding mechanism, a stationary support attachable to a projector, having a clip opening for receiving an attaching clip, a film unwinding reel supported on the stationary support comprising two spaced disks, one being a stationary disk and the other rotatable, a film supporting hub carried by the rotatable disk, a clip carried by the stationary disk for attaching the reel to the stationary support and for preventing the rotation of the stationary disk, a film outlet in the stationary disk, and a film receiving reel for taking up the film from the unwinding reel.

5. In a film winding mechanism, a vertical disk-like stationary support attachable to a projector having a film outlet opening near its center, and a clip receiving opening near its upper side, a film unwinding reel supported on the stationary support comprising two spaced rotatably arranged disks, one being stationary and the other rotatable, a film supporting hub carried by the rotatable disk and arranged between the two disks, a clip carried by the stationary disk for securing the reel to the stationary support, a film outlet in the stationary disk in registry with the film outlet of the support, and a receiving reel rotatably mounted beneath the film unwinding reel and arranged to take up the film from the unwinding reel.

6. In film winding mechanism for projectors, a film reel capable of use as an unwinding reel or as a receiving reel, comprising two spaced disks, one being rotatable with respect to the other, a film supporting hub carried by the rotatable disk and arranged between the two disks, a film outlet in the stationarly disk, and a clip secured to the stationary disk, the said clip being used as means for securing the reel to a support when the reel is used as an unwinding reel and the said clip being used as an attaching means for the end of a film when the reel is used as a receiving reel.

7. In film winding mechanism for projectors, a film reel capable of use as an unwinding reel or as a receiving reel, comprising two spaced disks, one being rotatable with respect to the other, a film supporting member carried by the rotatable disk on which film is wound when the reel is used as a receiving reel and from which film is unwound when the reel is used as an unwinding reel, a film outlet in the stationary disk through which film is fed when the reel is used as an unwinding reel, and means for attaching the reel to a support.

JAMES ROBERTSON.